US009638572B2

(12) United States Patent
Moon

(10) Patent No.: US 9,638,572 B2
(45) Date of Patent: May 2, 2017

(54) INTEGRATED AND STORABLE LUGGAGE SCALE

(71) Applicant: Jerry Moon, Taipei (TW)

(72) Inventor: Jerry Moon, Taipei (TW)

( * ) Notice: Subject to any disclaimer, the term of this patent is extended or adjusted under 35 U.S.C. 154(b) by 9 days.

(21) Appl. No.: 14/134,759

(22) Filed: Dec. 19, 2013

(65) Prior Publication Data

US 2014/0102812 A1  Apr. 17, 2014

Related U.S. Application Data

(63) Continuation of application No. 12/404,659, filed on Mar. 16, 2009, now Pat. No. 8,629,357.

(60) Provisional application No. 61/113,038, filed on Nov. 10, 2008.

(51) Int. Cl.
*A45C 7/00* (2006.01)
*A45C 13/00* (2006.01)
*G01G 19/58* (2006.01)

(52) U.S. Cl.
CPC ............ *G01G 19/58* (2013.01); *A45C 7/0086* (2013.01); *A45C 13/001* (2013.01)

(58) Field of Classification Search
CPC ...... G01G 19/58; A45C 13/001; A45C 7/0086
IPC ..................................................... G01G 19/58
See application file for complete search history.

(56) References Cited

U.S. PATENT DOCUMENTS

| | | | | |
|---|---|---|---|---|
| 4,424,841 A * | 1/1984 | Smith | ................. | A45C 7/0086 190/102 |
| 5,319,162 A * | 6/1994 | Ness | ........................ | G01G 3/00 116/DIG. 32 |
| 5,323,886 A * | 6/1994 | Chen | ...................... | A45C 5/143 16/113.1 |
| 5,842,673 A * | 12/1998 | Fenton | ..................... | A45C 5/14 190/102 |
| 5,873,504 A * | 2/1999 | Farmer | ..................... | A45C 3/00 150/113 |
| 5,964,384 A * | 10/1999 | Young | .................. | A45C 7/0063 190/103 |
| 6,347,693 B1 * | 2/2002 | Chen | .................... | A45C 7/0045 190/102 |
| 7,156,918 B2 * | 1/2007 | Marks | .................... | A45C 13/28 116/215 |
| 7,281,615 B2 * | 10/2007 | Siwak | .................... | A45C 13/28 16/114.1 |
| 7,282,653 B2 * | 10/2007 | Marks | .................... | A45C 13/28 177/126 |
| 7,358,449 B2 * | 4/2008 | Hannon | ................. | A45C 13/28 177/131 |
| 7,378,604 B2 * | 5/2008 | Truong | ................. | A45C 13/28 177/131 |
| 7,404,506 B1 * | 7/2008 | Ross | ...................... | A45C 13/28 177/164 |
| 7,501,591 B1 * | 3/2009 | Muniz | ................... | G01G 19/58 177/131 |
| 7,550,684 B2 * | 6/2009 | Kritzler | ................. | G01G 19/58 177/148 |
| 7,732,719 B1 * | 6/2010 | Schantz | ................ | G01G 19/58 177/126 |

(Continued)

*Primary Examiner* — Randy Gibson
(74) *Attorney, Agent, or Firm* — Buchalter

(57) ABSTRACT

Removable luggage scale devices are disclosed herein that include: at least one measuring device, at least one gripping member coupled to the measuring device, at least one coupling unit, wherein the coupling unit couples the at least one measuring device to at least one piece of luggage.

19 Claims, 5 Drawing Sheets

(56) References Cited

U.S. PATENT DOCUMENTS

| | | | | |
|---|---|---|---|---|
| 8,344,271 B1* | 1/2013 | Falk, Jr. | ............... | G01G 19/52 177/126 |
| 8,485,329 B1* | 7/2013 | Roy | ............... | A45C 13/28 177/149 |
| 8,629,357 B2* | 1/2014 | Moon | ............... | G01G 19/58 177/148 |
| 8,692,141 B2* | 4/2014 | Bieber | ............... | G01G 19/58 116/200 |
| 8,716,610 B2* | 5/2014 | Zyman Beer | ............... | G01G 19/56 116/215 |
| 8,766,111 B2* | 7/2014 | Lee | ............... | G01G 19/58 177/126 |
| 8,853,565 B2* | 10/2014 | Kritzler | ............... | G01G 19/58 177/126 |
| 9,119,453 B1* | 9/2015 | LaRocque | ............... | A45C 13/001 |
| 9,212,945 B2* | 12/2015 | Edwards | ............... | G01G 19/14 |
| 2002/0113715 A1* | 8/2002 | Wilson | ............... | G01B 5/02 340/815.45 |
| 2005/0051586 A1* | 3/2005 | Siwak | ............... | A45C 13/28 224/576 |
| 2007/0007048 A1* | 1/2007 | Gill | ............... | G01G 19/58 177/131 |
| 2007/0045011 A1* | 3/2007 | Dittrich | ............... | G01G 23/3728 177/148 |
| 2007/0056779 A1* | 3/2007 | Laniado | ............... | A43C 11/00 177/245 |
| 2007/0205025 A1* | 9/2007 | Taha | ............... | A45C 3/00 177/245 |
| 2008/0035391 A1* | 2/2008 | Jewett | ............... | G01G 21/28 177/126 |
| 2009/0057037 A1* | 3/2009 | Muniz | ............... | G01G 19/58 177/131 |
| 2010/0181354 A1* | 7/2010 | Laniado | ............... | A43C 11/165 224/259 |
| 2010/0270116 A1* | 10/2010 | Wilson | ............... | A45C 13/30 190/102 |
| 2011/0186357 A1* | 8/2011 | Sheikh | ............... | G01G 19/58 177/148 |
| 2013/0036777 A1* | 2/2013 | Lin | ............... | G01G 19/58 70/30 |
| 2013/0043079 A1* | 2/2013 | Levin | ............... | G01G 19/58 177/1 |

* cited by examiner

INTEGRATED AND STORABLE LUGGAGE SCALE

This application is a United States Continuation Application that claims priority to U.S. Utility application Ser. No. 12/404,659 entitled "Integrated and Storable Luggage Scale", which was filed on Mar. 16, 2009 and claims priority to U.S. Provisional Application Ser. No. 61/113,038 filed on Nov. 10, 2008, both of which are commonly-owned and incorporated herein in their entirety.

FIELD OF THE SUBJECT MATTER

The field of the subject matter is an integrated and storable luggage scale for use with all forms and sizes of luggage, carry-on luggage, executive briefcases and other travel storage devices.

BACKGROUND

Various designs of luggage scales, both independent and integrated, are currently being produced, especially given the increased restrictions from airlines on the number of checked bags, the number of carry-on bags, and the weight of the bags independently and in total.

U.S. Pat. No. 7,358,449 issued to Hannon discloses a portable weight measuring device that comprises a "container support member" that engages a container, such as a piece of luggage. While the disclosed weight measuring device performs the task at hand, it is not recessed away when not in use and is considered to be a rather complicated device to manufacture.

US Publication 2007/0007048 by Gill discloses another luggage weight measuring device. In this disclosure, the weight measuring device is integrated into the handle as part of the luggage. While this disclosure may solve the problem of storage of the weight measuring device, the design does not allow for ease of integration and removal of the device, so that the weight measuring system can be utilized in other applications. In addition, it is clear from the positioning of the weight measuring device that when the piece of luggage is used repeatedly, the weight measuring device may cause the handle to become unstable or undesirably detached from the luggage.

US Publication 2007/0205025 to Taha solves the problem of the Gill publication by removing the scale device from the handle and placing it on the body of the luggage, so that the luggage and scale are integrated. While this addresses some issues of previous designs, it does not allow the user to weigh additional luggage components to give a "total weight" before travel. The Taha device also isn't easily hidden in the luggage in order to avoid damage during transport.

It would be desirable to develop a luggage scale that is a) easy to execute in production (i.e. the assembly process of building a scale into luggage), b) aesthetically pleasing, since the scale is recessed away when not in use, and c) a reduced risk of damage to a precise instrument, because it can be recessed away into the luggage. It would also be desirable to develop a luggage scale that can be utilized on one piece of luggage, but can also easily weigh additional components to provide a "total weight" to the traveler before transport.

SUMMARY OF THE SUBJECT MATTER

Removable luggage scale devices are disclosed herein that include: at least one measuring device, at least one gripping member coupled to the measuring device, at least one coupling unit, wherein the coupling unit couples the at least one measuring device to at least one piece of luggage.

DETAILED DESCRIPTION

Figure 1:
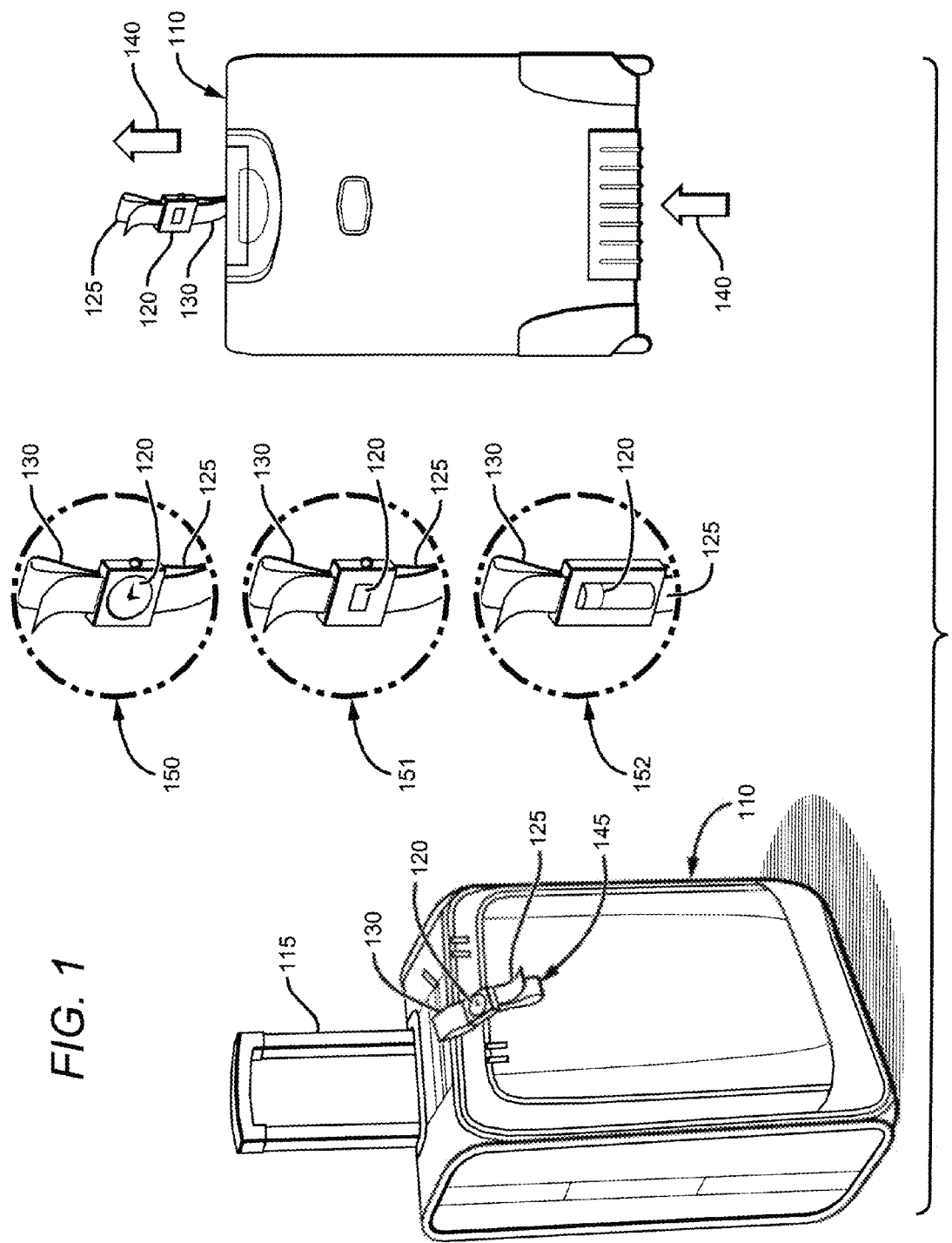
FIG. 1 shows a contemplated luggage scale device.

In order to meet the goals described above, a measuring device or luggage scale has been developed that: a) is easy to execute in production (i.e. the assembly process of building a scale into luggage), b) is aesthetically pleasing, since the scale can be easily recessed away when not in use, c) provides a reduced risk of damage to a precise instrument, because it can be recessed away into the luggage; and d) is utilized on one piece of luggage, but can also easily weigh additional components to provide a "total weight" to the traveler before transport. Contemplated luggage scales and luggage scale devices measure the weight of the at least one luggage/bag to which or upon which it is attached.

Contemplated removable luggage scale devices are disclosed herein that include: at least one measuring device, at least one gripping member coupled to the measuring device, at least one coupling unit, wherein the coupling unit couples the at least one measuring device to at least one piece of luggage.

Contemplated luggage scales are also placed centrally on contemplated luggage, whether on the top or side of the luggage, in order to balance the weight of the piece of luggage during use, and the scales comprise either an electronic or non-electronic measuring sensor.

Contemplated luggage scales comprise a device or processor that determines the weight of the suitcase and its contents by receiving and processing information detected by the weight sensors. Contemplated devices and/or processors are understood to be viable in an analog embodiment, a digital embodiment or a combination thereof. The weight of the luggage is then displayed in a viewable display (electronic or non-electronic). A contemplated processor is not restricted by shape or size and may come in various forms.

Contemplated luggage scales are removable and/or attachable to the handle of the bag by at least one coupling unit. Contemplated removable luggage scale devices comprise at least one coupling unit, wherein the coupling unit couples the luggage scale device to at least one piece of luggage either directly or indirectly. In contemplated embodiments, the at least one coupling unit will be directly coupled to the at least one measuring device and will include at least one flexible strap. In these embodiments, the at least one coupling unit is indirectly coupled to the piece of luggage through the at least one flexible strap. In other contemplated embodiments, the at least one coupling unit is directly attached to the piece of luggage.

In contemplated embodiments, the at least one coupling unit may comprise any suitable material or component. In some embodiments, the at least one coupling unit comprises a metal, a composite material, a polymer-based material or a combination thereof. In addition, the at least one coupling unit may comprise any suitable shape, including a buckle, a swivel hook, a "S" hook, a dog hook or a combination thereof. In contemplated embodiments, the at least one coupling unit is designed to couple with the luggage scale device and with the at least one flexible strap. In other embodiments, the at least one coupling unit is designed to couple with the luggage scale device and with the at least one flexible strap and/or the piece of luggage.

Contemplated luggage scale devices comprise at least one gripping member that is coupled to the at least one measuring device. In some embodiments, contemplated gripping members comprise a flexible strap, a handle, a loop of material, a padded material or a combination thereof. In contemplated embodiments, the flexible strap may comprise any suitable material or component. In some embodiments, the at least one flexible strap comprises fabric, nylon, leather or any combination thereof.

Figure 3:
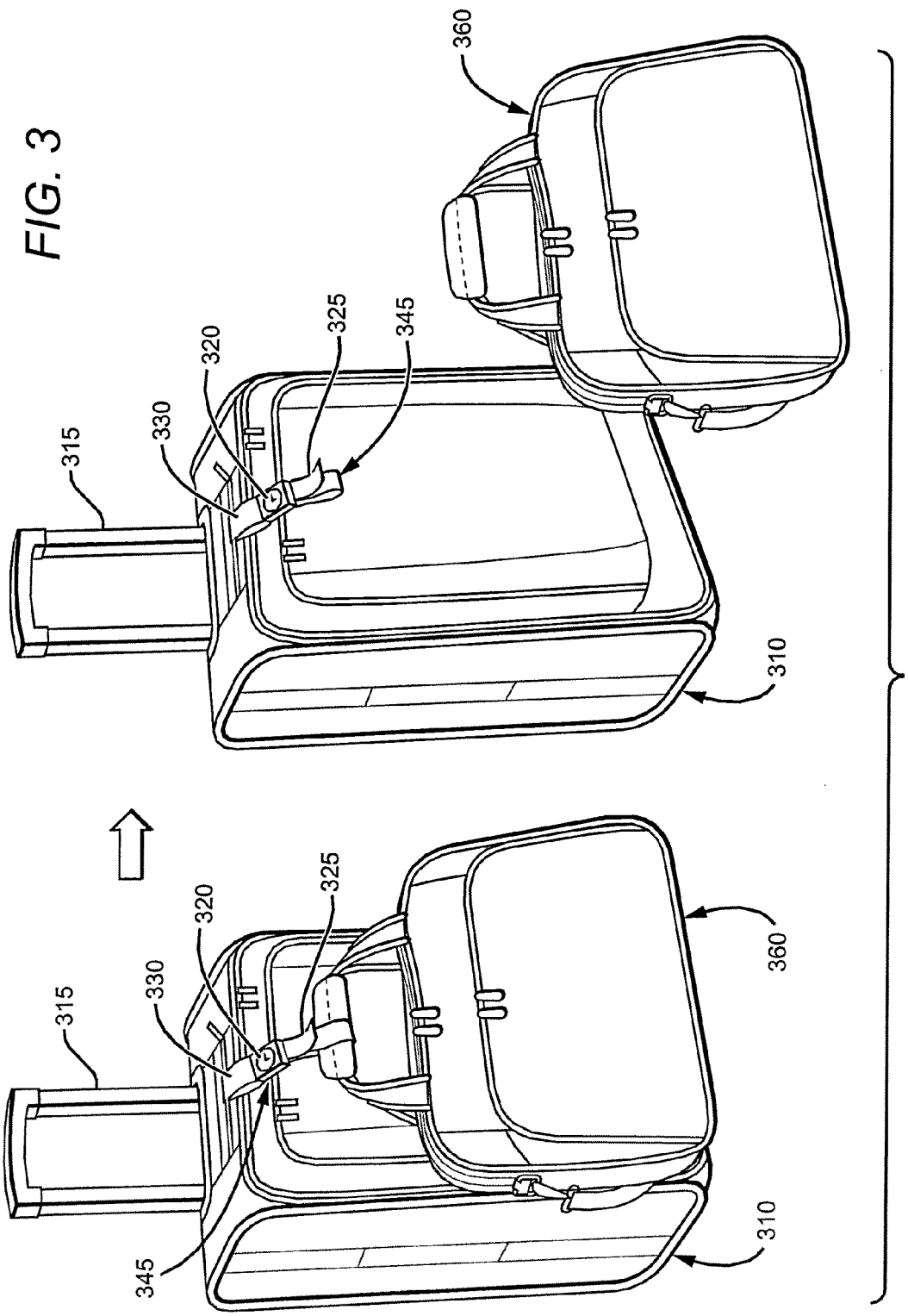
FIG. 3 shows a contemplated luggage scale device.

In some embodiments, the at least one gripping member may be an extension of the at least one flexible strap that may be part of the at least one coupling unit. Different configurations of these figures will be shown in the Figures and described in the Examples. In some embodiments, the at least one gripping member can be used by the user to pick up the luggage in order to get a weight of the luggage. In another contemplated embodiment, the at least one gripping member can be used to grip another piece of luggage to the first piece of luggage (as shown in FIG. 3). In these embodiments, the luggage scale device can be used to both weigh both pieces of luggage and act as a coupling unit for both pieces of luggage to one another during transport.

Contemplated removable luggage scale devices can function as measuring devices for luggage or it can function as a strap to which an additional smaller piece may be attached. The measuring device is either electronic (sensors to detect the weight) or non-electronic manual scale to detect the weight. More specifically, a contemplated luggage scale may be easily attached or detached from the luggage or bag.

Contemplated removable luggage scale devices, as mentioned, comprise at least one measuring device. Contemplated measuring devices comprise at least one readout interface. In some embodiments, the readout interface comprises a digital readout, an analog readout, a dial readout or a combination thereof. In other embodiments, the at least one measuring device may also comprise an audio component. These contemplated audio components are designed to provide an audio output to the user that indicates the weight of the luggage, in case the user is vision-impaired.

EXAMPLES

Example 1

Types of Measuring Devices

FIG. 1 shows a contemplated piece of luggage 110 having a handle 115. A contemplated removable luggage scale device 145 is shown that comprises a measuring device 120, a gripping member 125 coupled to the measuring device 120, and a coupling unit 130, wherein the coupling unit couples the measuring device 120 to at least one piece of luggage 110.

Contemplated removable luggage scale device 150 comprises an analog measuring device 120. Contemplated removable luggage scale device 151 comprises a digital measuring device 120. Contemplated removable luggage scale device 152 shows another type of measuring device 120 that is applied force-sensitive.

FIG. 1 also shows a contemplated method of weighing a piece of luggage, wherein the luggage 110 is picked up 140 by the gripping member 125 in order to register the weight of the piece of luggage 110 on the measuring device 120.

Example 2

Placement/Positioning of Luggage Scale Devices

Figure 2:
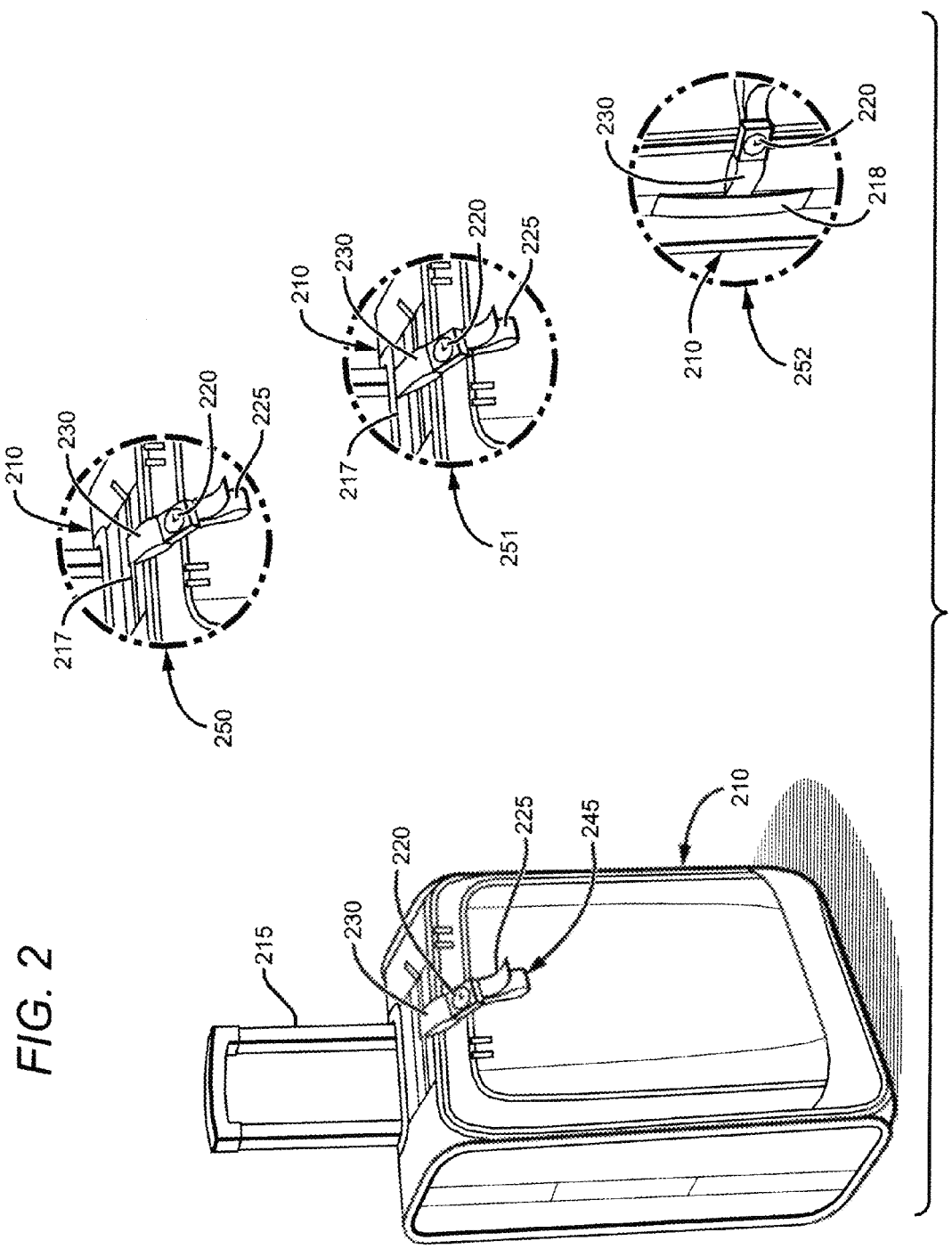
FIG. 2 shows a contemplated luggage scale device.

FIG. 2 shows a contemplated piece of luggage 210 having a handle 215. A contemplated removable luggage scale device 245 is shown that comprises a measuring device 220, a gripping member 225 coupled to the measuring device 220, and a coupling unit 230, wherein the coupling unit couples the measuring device 220 to at least one piece of luggage 210.

As shown in this Figure, contemplated luggage scales may be placed at different positions or locations on the luggage/bag, including coupled to the at least one piece of luggage by the top luggage handle, a portion of the top luggage handle, the side luggage handle, a portion of the side luggage handle or a combination thereof.

The positioning of the device is illustrative and may also be placed in additional or different positions. In Figure box 250, a luggage scale device 245 is coupled to the top handle carrier 217, whether it is positioned under or on the top handle carrier 217. In Figure box 251, a luggage scale device 245 is located directly under the top handle carrier 217. A contemplated luggage scale device (specifically the coupling unit of the luggage scale device) is positioned directly underneath the top handle carrier (but not on it as Figure box 250). It may be attached to the ringlet that is sewn underneath the top handle. In Figure box 252, a contemplated luggage scale device 245 may be positioned such that it is coupled to the side-top handle carrier 218.

Example 3

Additional Features/Functions

FIG. 3 shows a contemplated piece of luggage 310 having a handle 315. A contemplated removable luggage scale device 345 is shown that comprises a measuring device 320, a gripping member 325 coupled to the measuring device 320, and a coupling unit 330, wherein the coupling unit couples the measuring device 320 to at least one piece of luggage 310.

In this Figure, a contemplated luggage scale device may be utilized for several purposes, including measuring the weight of at least one piece of luggage (310 and 360) and providing an attachment point for a second piece of luggage 360 to the first piece of luggage 310 by utilizing the gripping member.

Example 4

Attachment/Detachment—Coupling Unit

Figure 4:
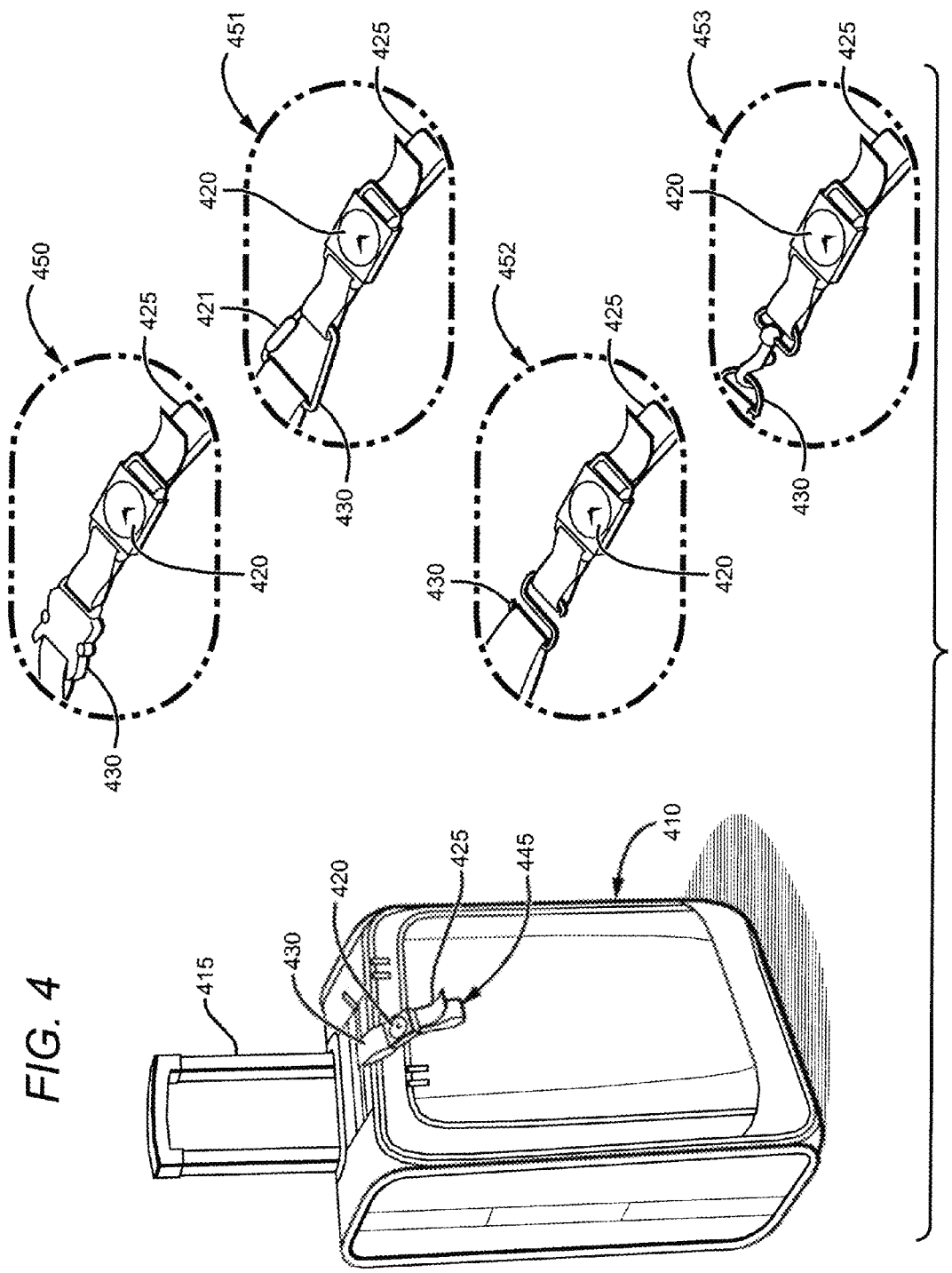
FIG. 4 shows a contemplated luggage scale device.

FIG. 4 shows a contemplated piece of luggage 410 having a handle 415. A contemplated removable luggage scale device 445 is shown that comprises a measuring device 420, a gripping member 425 coupled to the measuring device 420, and a coupling unit 430, wherein the coupling unit couples the measuring device 420 to at least one piece of luggage 410.

This Figure is designed to show a plurality of coupling units that may be used to couple the measuring device to the at least one piece of luggage. In Figure box 450, the at least one coupling unit 430 comprises a flexible strap coupled to the measuring device 420 and a buckle, wherein the buckle mates with a similar unit on the piece of luggage 410.

In Figure box 451, the at least one coupling unit 430 comprises a flexible strap coupled to the measuring device 420 and a closed loop fixture having a screw opening 421, wherein the closed loop fixture mates with a strap or other coupling member on the piece of luggage 410.

In Figure box 452, the at least one coupling unit 430 comprises a flexible strap coupled to the measuring device 420 and a "S" hook, wherein the "S" hook mates with a strap or other coupling member on the piece of luggage 410.

In Figure box 453, the at least one coupling unit 430 comprises a flexible strap coupled to the measuring device 420 and a detachable swivel hook, wherein the swivel hook mates with a strap or other coupling member on the piece of luggage 410.

It should be understood that the flexible strap that is described herein as part of the at least one coupling unit 430 may not be present in some contemplated embodiments, and the measuring device 420 may be coupled to the piece of luggage through any number of hooks, loop fixtures and/or buckles.

Example 5

Storage of Contemplated Luggage Scale Devices

Figure 5:
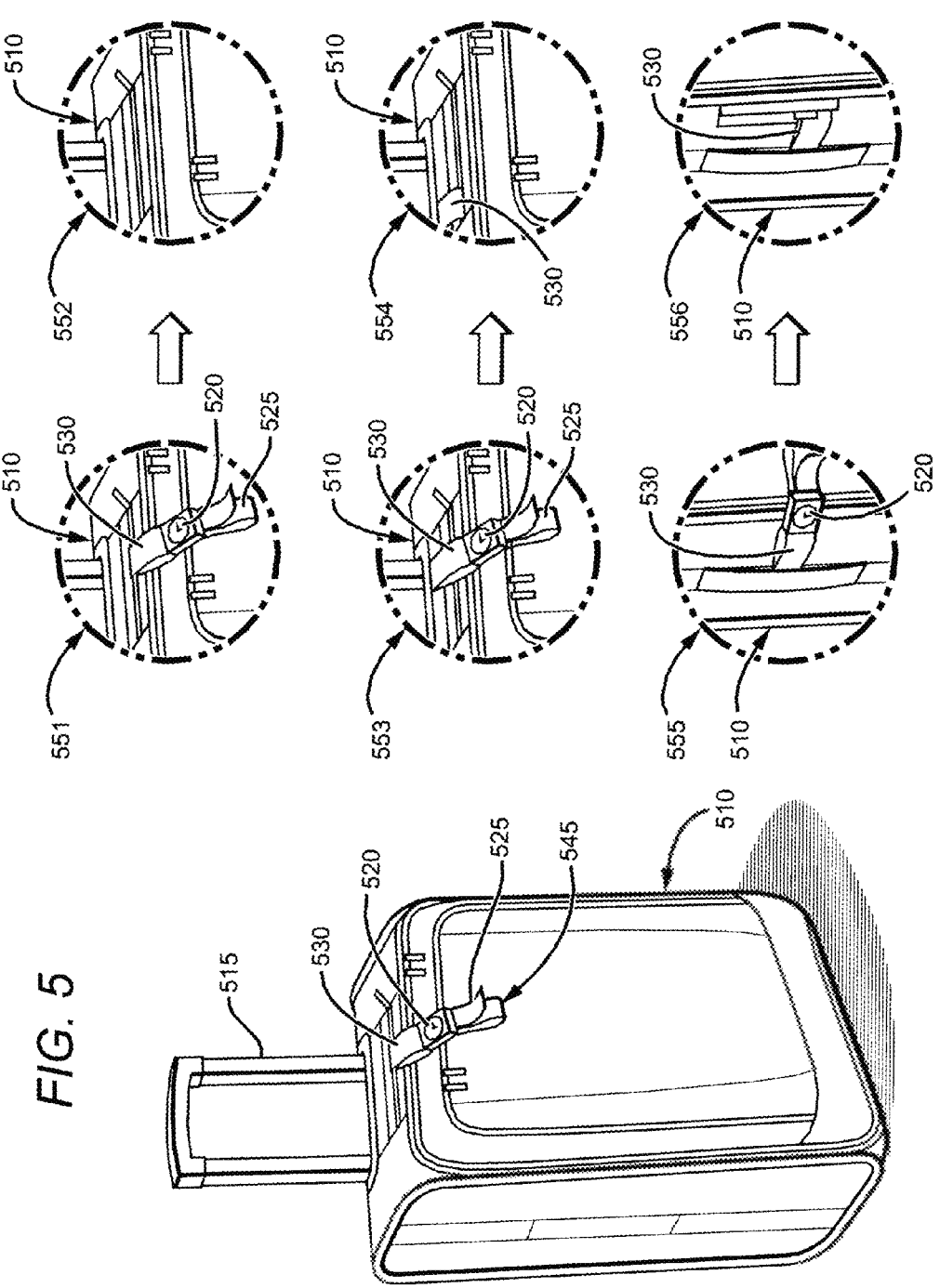
FIG. 5 shows a contemplated luggage scale device.

FIG. 5 shows a contemplated piece of luggage 510 having a handle 515. A contemplated removable luggage scale device 545 is shown that comprises a measuring device 520, a gripping member 525 coupled to the measuring device 520, and a coupling unit 530, wherein the coupling unit couples the measuring device 520 to at least one piece of luggage 510.

This Figure illustrates how contemplated luggage scale devices 545 can be stored inside of the piece of luggage 510. In Figure box 551, the luggage scale device is attached to the top handle carrier, as shown in FIG. 2. In Figure box 552, the luggage scale device is not shown, because it is stored in the piece of luggage 510.

In Figure box 553, the luggage scale device is coupled under the top handle carrier, as shown in FIG. 2. In Figure box 554, the luggage scale device is not shown, because it is stored in the piece of luggage 510 with a piece of the coupling unit showing 530.

In Figure box 555, the luggage scale device is coupled to the side handle carrier, as shown in FIG. 2. In Figure box 556, the luggage scale device is not shown, because it is stored in the piece of luggage 510 with a piece of the coupling unit showing 530.

Thus, specific embodiments, methods of integrated and storable luggage scales have been disclosed. It should be apparent, however, to those skilled in the art that many more modifications besides those already described are possible without departing from the inventive concepts herein. The inventive subject matter, therefore, is not to be restricted except in the spirit of the disclosure herein. Moreover, in interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

I claim:

1. A removable luggage scale device, comprising:
   at least one measuring device,
   at least one gripping member coupled to the measuring device,
   at least one coupling unit, wherein the coupling unit couples the
   at least one measuring device to at least one piece of luggage,
   at least one other coupling unit, wherein the coupling unit couples the at least one measuring device to at least one other piece of luggage; and
      wherein the at least one other coupling unit comprises a gripping member.

2. The removable luggage scale device of claim 1, wherein the at least one measuring device comprises a digital scale, an analog scale or a combination thereof.

3. The removable luggage scale device of claim 1, wherein the at least one measuring device comprises a digital scale.

4. The removable luggage scale device of claim 1, wherein the at least one coupling unit comprises a flexible strap.

5. The removable luggage scale device of claim 4, wherein the at least one flexible strap comprises fabric, nylon, leather or any combination thereof.

6. The removable luggage scale device of claim 1, wherein the at least one coupling unit comprises a buckle, a swivel hook, a "S" hook, a dog hook, a loop fixture, a flexible strap or a combination thereof.

7. The removable luggage scale device of claim 6, wherein the at least one coupling unit comprises a metal, a composite material, a polymer-based material or a combination thereof.

8. The removable luggage scale device of claim 1, wherein the at least one measuring device comprises a readout interface.

9. The removable luggage scale device of claim 8, wherein the readout interface comprises a digital readout, an analog readout, a dial readout or a combination thereof.

10. The removable luggage scale device of claim 1, wherein the at least one measuring device comprises an audio component.

11. The removable luggage scale device of claim 10, wherein the audio component provides audio output of the weight to a user.

12. The removable luggage scale device of claim 1, wherein the at least one gripping member comprises a flexible strap, a handle, a loop of material, a padded material or a combination thereof.

13. The removable luggage scale device of claim 1, wherein the at least one gripping member is further coupled to a second piece of luggage.

14. The removable luggage scale device of claim 1, wherein the device is further storable in the at least one piece of luggage.

15. The removable luggage scale device of claim 1, wherein the device is coupled to the at least one piece of luggage by the top luggage handle, a portion of the top luggage handle, the side luggage handle, a portion of the side luggage handle or a combination thereof.

16. The removable luggage scale device of claim 1, wherein the at least one other coupling unit comprises a looped strap.

17. The removable luggage scale device of claim 16, wherein the at least one other coupling unit comprises a swivel hook.

18. The removable luggage scale device of claim 16, wherein the at least one other coupling unit comprises a "S" hook.

19. The removable luggage scale device of claim 16, wherein the at least one other coupling unit comprises a dog hook.

\* \* \* \* \*